United States Patent Office 3,171,744
Patented Mar. 2, 1965

3,171,744
METHOD OF FORMING LATENT AND VISIBLE VESICULAR IMAGES IN REFRACTIVE IMAGE FILMS
Warner L. Peticolas, 1197 Norval Way, and Ulo Vahtra, 3879 Almaden Road, both of San Jose, Calif.
No Drawing. Filed Feb. 23, 1962, Ser. No. 175,341
1 Claim. (Cl. 96—49)

This invention relates to refractive image-forming photographic films. More particularly, it relates to forming invisible images in refractive image-forming films and the later development of these films.

Prior to our invention, no one has been able to form latent images in refractive image-forming films because the gas needed to form the required bubbles within the film escaped from the film if the film was not immediately processed.

We have now discovered that we can form essentially invisible images in refractive image-forming films and can develop these films at a later date. Essentially, our invention comprises exposing a refractive image film to image-defining electromagnetic radiation to form a gas in the exposed area of the film, relaxing the film to form permanent substantially invisible bubbles in the exposed area of the film, forming a gas throughout the film, and relaxing the film to develop a visible image corresponding to the latent image without forming bubbles uniformly throughout the film.

It is surprising that the effective speed of the film is increased by our new process. Apparently, the invisible bubbles act as nucleating centers for gases which flow into the bubbles from areas within the film adjacent the bubbles.

This effect generally allows a visible image to be formed by substantially less thermal energy than is required to fog the image background.

The exact amount of heat required for a desired optical density or to fog the image background can readily be determined by routine tests.

The following definitions will aid in understanding our invention. The term "bubbles" includes not only spheroids but also more irregular cavities. The bubbles may completely or partially enclose a nucleating particle. The term "invisible bubbles" is meant to include not only completely invisible bubbles, but also bubbles that form haze in the film. The term "substantially invisible" will be used on occasion to describe a haze in exposed areas of the film. The verb "relax" includes any treatment a refractive image forming film which causes the formation of bubbles within the film. Generally, "relaxation" is accomplished by heating a film containing a gas under pressure to soften the polymer and thereby allow the gas to form bubbles. "Relaxation" is generally accomplished at temperatures below the second order transition point of the polymer. Where the pressure within the film is sufficient, "relaxation" can also be accomplished by subjecting the film to external pressure with a stylus or roller or by placing the film in a vapor of a solvent or plasticizer for the film, etc. Electromagnetic radiation is meant to include radiant energy from X-rays to infra-red of sufficient energy to form a gas or a liquid capable of volatilization at temperatures below the melting point of the polymer.

Several types of film are included within the definition of the "refractive image forming films." These films and processes for their utilization are discussed in the following paragraphs.

The usual diazo sensitized film, for example, a film of polyvinyl chloride containing about 5–10% by weight and preferably about 6–8% by weight p-dimethylaminobenzene diazonium zinc chloride salt, can be utilized by exposing the film to image-defining light for about 10–30 seconds and heating the film to form invisible bubbles within the exposed area of the film. The film can be developed later by uniformly exposing the film, which still contains about 50–65% of the original diazonium compound, to ultraviolet light and subsequently heating the film to form visible bubbles in the area of the latent image.

In another useful film, a low boiling liquid such as acetone or dichloro difluoromethane is suspended in a solid polymer matrix such as polystyrene. On heating through a stencil, the entrapped liquid gasifies. The temperature is raised until invisible bubbles of desired size are blown in the plastic matrix. The temperature is then reduced to a temperature above the boiling point of the dispersed phase liquid but below that temperature required to soften the polymer matrix and the gas allowed to escape from the film. The latent image in the film is later developed by uniformly heating the film in a step analogous to that in the development of the diazo-containing film.

In still another film, a polymer such as polymethyl isopropenyl ketone and magnesium carbonate particles having a diameter of 0.2–0.3 micron are interspersed in a matrix polymer such as polyvinyl chloride. On exposure to ultraviolet light, the polymethyl isopropenyl ketone reverts to the monomer, methyl isopropenyl ketone. The monomer is vaporized by heat to form the desired bubbles.

A cast sheet of polymethyl α-chloroacrylate, or other lower alkyl ester of α-chloroacrylic acid, is useful as a thermographic film in our process. The cast film is heated through an insulating stencil to about 220° C. for about 1.15 to 1.25 minutes to form a latent image which can be further developed by heating the film at 170° C.

Another refractive image-forming film is made up containing two photosensitive substances which are sensitive to electromagnetic radiation of different wave lengths, for example, p-dimethylaminobenzene diazonium chloride zinc salt which decomposes on exposure to light of essentially 3850 A. wave length and 7-dimethylamino-3-oxo-dihydrobenzo-1, 4-thiazine-6-diazonium chloride zinc salt which can be decomposed at essentially 4750 A. wave length. In such a film, the film is exposed to image-defining radiation which would decompose the longer wave length sensitive diazo compound and the desired latent image developed by heating to about 180° C. The positive image is developed by uniformly exposing the film to radiation which will decompose the material sensitive to the shorter wave length and heating to form the desired image.

In all the above films and processes, the gas which forms the invisible bubbles can be allowed to diffuse from the refractive-image forming film prior to developing a visible image corresponding to the invisible latent image.

Generally speaking, the diameter of the invisible bubbles must be on the order expressed by the relationship to $\gamma/p$ where $\gamma$ is the surface tension of the polymeric matrix in dynes and $p$ is the pressure in millimeters of mercury of the bubble-forming gas within the matrix. For example, where a film has a surface tension of 30 dynes/cm. and an internal gas pressure of 30 atmospheres gauge, the minimum bubble diameter would be $0.02\mu$. The bubbles forming these microcavities should be no larger than about 0.5 micron in diameter as the bubbles become visible when the diameter is in excess of about this diameter.

The minimum bubble diameter required to insure a permanent bubble varies with the polymer, the amount of plasticizer in the molecule matrix, the temperature, the gas pressure, the diffusion rate of the gas through the polymer, and other factors.

The required exposure time, heat development temperatures, etc., vary with the polymer mixtures, the blowing gas, and the amount of plasticizer in the polymer. To formulate a set of operable conditions for each of the many photo or heat decomposable materials and polymer combinations would be impossible.

A certain skill on the part of those skilled in the art is required to formulate a set of specific conditions for the development of appropriate cavities in the polymer matrices. However, the necessary conditions for each such system can readily be determined by a series of routine experiments requiring only pedestrian skill.

Our invention is further illustrated by the following specific examples:

Example I

An 80–20 polyvinyl chloride-polymethylmethacrylate film containing 7% p-dimethylaminobenzene diazonium chloride zinc salt was exposed for 30 seconds to the light from a GE U-Varc II Lamp through a silver negative Stepwedge. The film was then developed for 15 seconds in a bath of diethylbenzene at 185° C. The diffused density of the steps was: (a) 0.49, (b) 0.39, (c) 0.13, (d) 0.7, (e) 0.00, (f) 0.00, (g) 0.00. The film was then completely exposed to light for 30 seconds and heated to about 210° C. in a glycol bath to produce the following densities: (a) 0.49, (b) 0.33 (c) 0.27, (d) 0.20, (e) 0.16, (f) 0.08, (g) 0.00. Five full steps of graphic images were brought out by development of the later image. These last five steps are from latent images. It will be noted that utilization of this procedure increases, in effect, the speed of the film 4–5 times.

Example II

To obtain a latent image in the film of polymethyl isopropenyl ketone, a four millimeter film of the polymer is cast on glass. Magnesium carbonate, 0.2% by weight, having a maximum diameter of about four microns is uniformly dispersed in the polymer. The film is exposed to a 250W UV arc lamp for 15–20 seconds and heated until a haze forms in the exposed areas. A more visible image is formed later by uniformly exposing the polymethyl isopropenyl ketone plate to ultraviolet radiation and further heating.

Now having described our invention what we claim is:

A process comprising:

exposing to image defining electromagnetic radiation a refractive image film which contains a polymeric matrix and at least one material which will decompose on exposure to electromagnetic radiation to form a gas in the exposed areas of the film;

relaxing the film whereby said formed gas coagulates to form a permanent latent image of substantially invisible bubbles in the exposed areas of the film, the bubbles comprising the latent image having a minimum diameter at least on the order expressed by relationship to $\gamma/p$ where $\gamma$ is the surface tension of the polymeric matrix in dynes and $p$ is the pressure in millimeters of mercury in the bubble forming gas and a maximum diameter of about 0.5 micron;

forming a gas within the film by exposing the electromagnetically decomposable material which remains throughout the film to electromagnetic radiation, and relaxing the film to form visible bubbles in the area of the latent image.

References Cited in the file of this patent

UNITED STATES PATENTS

| | | |
|---|---|---|
| 2,703,756 | Herrick et al. | Mar. 8, 1955 |
| 2,911,299 | Baril et al. | Nov. 3, 1959 |
| 2,976,145 | Baril et al. | Mar. 21, 1961 |
| 3,091,532 | Michaelsen | May 28, 1963 |
| 3,120,437 | Lindquist | Feb. 4, 1964 |

FOREIGN PATENTS

| | | |
|---|---|---|
| 645,825 | Great Britain | Nov. 8, 1950 |
| 850,954 | Great Britain | Oct. 12, 1960 |
| 877,842 | Great Britain | Sept. 20, 1961 |

OTHER REFERENCES

Lindquist: IBM Technical Disclosure Bulletin, vol. 3, No. 2, July 1960, page 3.

UNITED STATES PATENT OFFICE
CERTIFICATE OF CORRECTION

Patent No. 3,171,744                                                    March 2, 1965

Warner L. Peticolas et al.

It is hereby certified that error appears in the above numbered patent requiring correction and that the said Letters Patent should read as corrected below.

In the grant, lines 1 to 3, for "Warner L. Peticolas and Ulo Vahtra, both of San Jose, California," read -- Warner L. Peticolas and Ulo Vahtra, of San Jose, California, assignors to International Business Machines Corporation, of New York, N. Y., a corporation of New York, --; line 12, for "Warner L. Peticolas and Ulo Vahtra, their heirs" read -- International Business Machines Corporation, its successors --; in the heading to the printed specification, lines 5 and 6, for "Warner L. Peticolas, 1197 Norval Way, and Ulo Vahtra, 3879 Almaden Road, both of San Jose, Calif." read -- Warner L. Peticolas and Ulo Vahtra, San Jose, Calif., assignors to International Business Machines Corporation, New York, N. Y., a corporation of New York --.

Signed and sealed this 27th day of July 1965.

(SEAL)
Attest:

ERNEST W. SWIDER                                   EDWARD J. BRENNER
Attesting Officer                                 Commissioner of Patents